March 17, 1970  H. A. BURGERT  3,501,137
UPHOLSTERING SPRING, ESPECIALLY FOR THE
BACK OF MOTOR VEHICLE SEATS
Filed Oct. 13, 1967  2 Sheets-Sheet 1
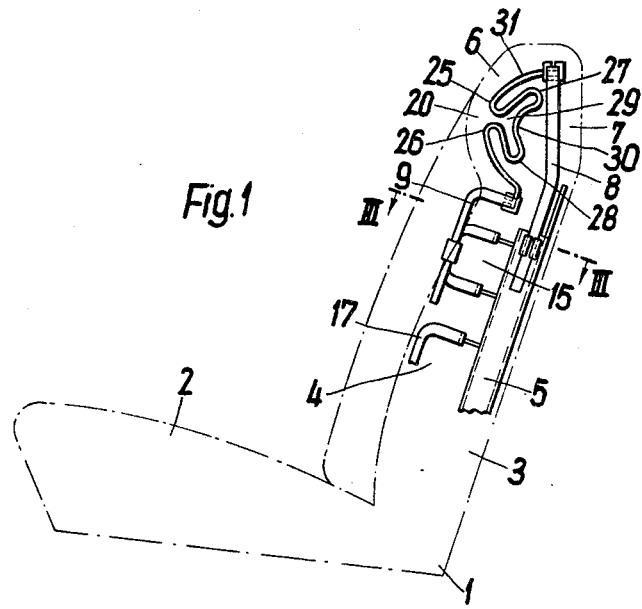
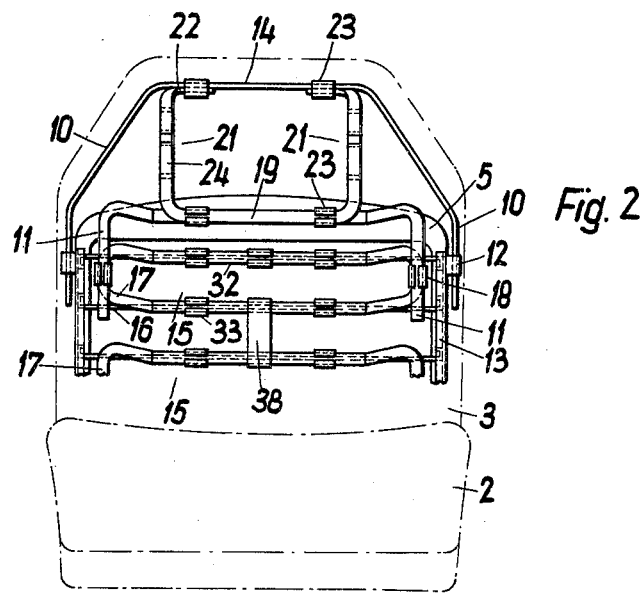
Inventor:
Herbert A. Burgert

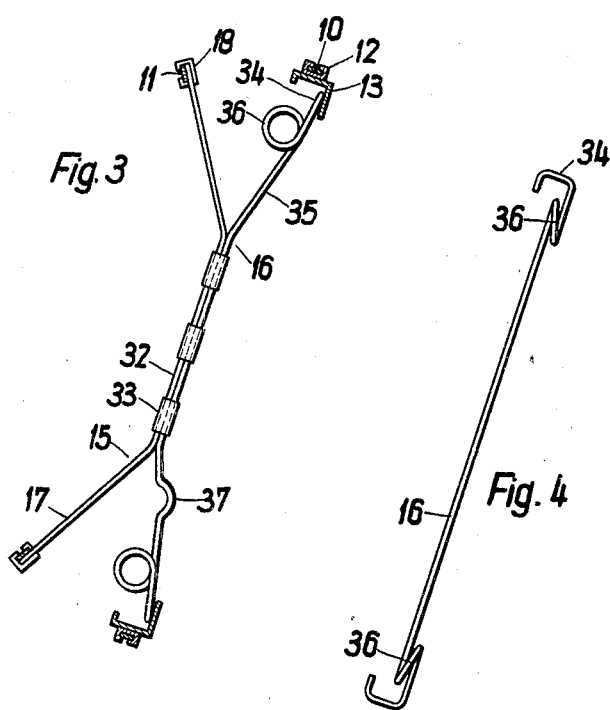

United States Patent Office
3,501,137
Patented Mar. 17, 1970

3,501,137
UPHOLSTERING SPRING, ESPECIALLY FOR THE BACK OF MOTOR VEHICLE SEATS
Herbert A. Burgert, Porza, Ticino, Switzerland, assignor to Unitechnik AG., Chur, Switzerland
Filed Oct. 13, 1967, Ser. No. 675,106
Claims priority, application Germany, Oct. 22, 1966, U 13,208
Int. Cl. F16f 3/02; A47c 7/36
U.S. Cl. 267—102       15 Claims

ABSTRACT OF THE DISCLOSURE

A spring system for a motor vehicle seat having a back supporting portion and a head supporting portion. Primarily spring means in the back supporting portion are connected to spring means in the head supporting portion so that both spring means form a spring unit with each other.

---

The present invention relates to an upholstering spring, especially for the back of motor vehicle seats. With heretofore known motor vehicle seats it is disadvantageous that separated head supports have to be mounted thereon for purposes of obtaining an improved safety against back injuries in case of a collision from the rear. These head supports can be connected to the back of the seat only by means of relatively rigid elements which in turn may cause injuries in case of accidents. Moreover, the head support as heretofore known may get detached or displaced. In addition thereto, the separate design of back and head support is relatively expensive.

It is, therefore, an object of the present invention to overcome the above mentioned drawback.

It is another object of this invention to provide a spring upholstered back for motor vehicle seats which will assure a safe support of the head of the person on the seat.

It is a further object of this invention to provide a spring upholstered back for motor vehicle seats as set forth in the preceding paragraph, which will be adjustable in such a way that it can be adapted to the different body sizes of the persons using the seat.

It is still another object of this invention to provide a spring upholstered back for motor vehicle seats which has its head supporting area free from rigid parts.

Still another object of this invention consists in providing a spring upholstered back for motor vehicle seats as set forth above which will be simple in construction and relatively inexpensive to manufacture.

These and other objects and advantages of the invention will appear more clearly from the following specification in connection with the accompanying drawings, in which:

FIG. 1 diagrammatically illustrates an upholstered motor vehicle seat according to the present invention.
FIG. 2 represents a front view of the seat of FIG. 1.
FIG. 3 is a section through the spring of the seat, said section being taken along the line II–II of FIG. 1.
FIG. 4 shows the spring of FIG. 3 as seen from the left.

The present invention is characterized primarily in that the spring upholstered back of a motor vehicle seat has connected thereto a spring upholstered section forming the head support while the spring in said back and the spring in said head support forming section form a single spring unit with each other. In other words, the spring in said head support is directly connected to the spring in the back of the seat so that in a simple manner any major rigid connecting elements or the like will be avoided whereby a higher degree of safety will be assured. Furthermore, according to the present invention, as set forth above the head support cannot detach itself from the back of the seat nor can it be displaced relative thereto so that even when transverse forces act upon the seat, as is the case for instance when driving through curves, the person in the seat will be safely supported.

According to a further development of the present invention, it is highly advantageous to provide the spring section in the head support with a rear holding member or yoke located in the plane of the back of the seat while a downwardly extending supporting spring which is curved several times is fastened to the upper area of said holding member. In view of said holding member which itself may be resilient, a safe location of the supporting spring will be assured.

Advantageously, the holding members are of a substantially U-shaped form and are connected at their downwardly directed legs while the supporting spring is connected to the transverse arm of the holding members so that a simple design and inexpensive manufacture of the spring system will be obtained.

For purposes of safely locating the spring portion of the head support, the rear and preferably wider holding member is connected preferably to the outside of the frame or spring box of the spring system for the back of the seat.

The supporting spring can be produced in a simple manner when it comprises two, in front view C-shaped symmetrically arranged supporting spring elements the legs of which face each other, said spring elements being separately connected, preferably by means of brackets. These two supporting spring elements will, when seen from the front, form a rectangular spring frame. The lateral parts of said spring frame which are curved a plurality of times in downward direction form a stronger resilient lateral frame portion, whereas the horizontal straight parts of the spring frame form a less strong resilient upper and lower portion of the frame so that the head is safely and still comfortably supported.

According to a further development of the invention, the web of each supporting spring element which web extends from the top in downward direction is by at least two bends in excess of 90° formed to a spring loop behind the web so that in spite of the small dimensions of the supporting spring element a highly elastic and with increasing spring stroke strongly progressively increasing spring force is obtained. This advantage may be further increased by designing the spring loop symmertically to a central plane parallel to the direction in which the main load is effective and by bending said spring loop four times by more than 90° while the part which connects the two inner bends is curved forwardly. Expediently, also the front parts of the bent web of the supporting spring element are curved forwardly to the center of the web so that a kind of crowned forwardly curved surface of the supporting spring element is obtained.

The supporting spring is advantageously made of strip steel so that the spring can be produced in a simple manner.

In order also to assure a vertical resilient movability of the head support within certain limits, the front holding member is advantageously mounted on at least one strip spring element which by means of at least one supporting spring is connected to the frame or spring box of the spring system for the back of the seat.

The supporting spring may in an expedient manner be bent of round wire. Advantageously, the supporting spring extends horizontally and has its ends connected.

According to a further suggestion of the present invention, the supporting spring between its connecting area at the strip spring element and the supporting frame has advantageously each side provided with at least one resilient bend whereby a highly satisfactory springiness of the back of the seat and of the front holding member of the head support will be assured. This bend may, for instance, also be formed by at least one torsion spring winding.

According to still a further development of the invention, the strip spring element is, when viewed from the front, subtsantially and preferably of the shape of a flat rectangle and is connected to the frame by means of two supporting springs which by brackets or the like are connected to the rear sides of the transverse webs so that relatively large surface strip spring elements are obtained which are mounted on the spring box separate from each other and which may be interconnected, for instance, by intermediate brackets.

The holding members may also be made of flat steel in which instance they are advantageously supported in such a way that they can be adjusted as to height. In order to be able to maintain the inherent elasticity of the front holding member within limits in spite of a light structure, the flat steel of the front holding member is located in a plane which is substantially perpendicular to the direction in which the load acts.

Referring now to the drawings in detail, FIGS. 1 and 2 diagrammatically illustrate in dot-dash lines a motor vehicle seat 1 with a seat portion 2 and a back 3. Within the back 3 there is provided an upholstering 4 which comprises a substantially rectangular spring box or frame 5 which corresponds in width to the width of the back 3. Connected to the upholstery 4 of the back 3 within the upper area thereof is the upholstering spring portion 7 of a head support forming a structural unit with the back 3. The section 7 of the head support 6 comprises a rear holding member or yoke 8 and a front holding member or yoke 9. The two holding members 8 and 9 when viewed from the front according to FIG. 2 form substantially U-shaped members with downwardly directed legs 10 and 11 respectively. The rear holding member 8 has its legs 10 guided in C-shaped brackets 12 which are located at the outside of the downwardly directed legs 13 of the spring box 5. The rear holding member 8 will thus be located approximately in the plane of the spring box 5. Above the brackets 12, the legs 10 of the rear holding member 8 are, when viewed from the side, slightly bent off toward the front so that the transverse member 14 of the holding yoke 8 is located somewhat in front of the plane of the spring box 5.

Between the legs 13 of the spring box 5 there are arranged one above the other a plurality of flat or spring leaf elements 15 which when viewed from the front have an outstretched rectangular shape. These flat spring elements 15 are by means of supporting springs 16 elastically mounted relative to the spring box 5. The outer section 17 of said elements 15 which are located toward the side are at an incline angled off toward the outside from the plane which is parallel to the seat frame and form the upholstering spring proper of the back 3 which in view of this design is somewhat trough or bucket-like.

As will be seen from FIGS. 1 and 2, the front holding member 9 of the spring portion 7 of the head support 6 is by means of its downwardly directed legs 11 guided in brackets 18 which are provided on the outside portion 17 of the uppermost flat spring element 15 of the upholstering 4. The brackets 12, 18 for mounting the holding members 8, 9 are so designed that the holding members 8, 9 may in the longitudinal direction of their legs 10, 11, i.e. approximately vertically be displaced relative to the upholstering 4.

The transverse arm 19 of the front holding member 9 is by means of cranks offset relative to the legs 11 in the direction toward the rear holding member 8. This is done in such a way that the transverse arm 14 of the rear holding member 8 is approximately vertical above the transverse arm 19 of the front holding member 9. Between the two transverse arms 14, 19 of the two holding members 8, 9 there is fastened a supporting spring 20 which forms the upholstering spring proper for the head support 6. The supporting spring 20 comprises two substantially C-shaped supporting spring elements 21 which have their legs 22 face each other and are connected to these legs 22 by brackets 23 on the transverse arms 14, 19 of the holding members 8, 9. The supporting spring elements 21 together with the transverse arms 14, 19 of the holding members 8, 9 form an approximately rectangular spring frame when viewed from the front.

As seen from FIG. 1, the arms 24 extending in downward direction and pertaining to the supporting spring elements are when viewed from the side curved a plurality of times. Each arm 24 has four bends 25–28 by more than 90° in such a way that a rearwardly protruding spring loop 29 is formed. The spring loop 29 is located approximately within the central area of the arm 24 of the supporting spring element 21 and symmetrically designed with regard to a central plane between the two front bends 25, 26. The portion 30 which is located between the two inner bends 27, 28 and pertains to the supporting spring element is somewhat curved forwardly. As will be evident from FIG. 1, the bends of the arm 24 of each supporting element 21 amount to about 180°. The front portions 31 of the bent member 24 are curved toward the front and the center of the arm which means toward the said plane of symmetry so that a substantially crowned outer surface of the supporting spring element is formed.

The rear and the front holding members 8, 9 are band or flat steel. The flat steel of the rear holding member 8 is approximately parallel to the plane of the direction of which the main load acts upon the upholstering, whereas the flat steel of the front holding member 9 is located in a plane which is approximately perpendicular to the direction in which the main load acts. For this reason, the upper legs 22 of the supporting spring elements likewise made of flat steel are distorted in such a way that they are located substantially parallel to the flat steel of the transverse arm 14 pertaining to the rear member 8 and can be connected thereto by means of brackets 23. The lower legs 22 of the supporting spring elements 21 are likewise located flat on the transverse arm 19 of the lower holding member 9 and are connected thereto by means of brackets 23. Above the mounting areas 12 of the rear holding member 8 the legs 10 thereof extend at an incline toward each other so that the transverse arm 14 is shorter than the spacing of the legs 10 from each other, while the transverse arm 14 has a length corresponding approximately to the distance of the supporting spring elements 21 or the width of the supporting springs 20.

As will furthermore be evident from FIGS. 1–4, each flat spring element 15 is, by means of two supporting springs 16 mounted on the spring box 5 while the supporting springs 16 are connected to the rear sides of the substantially horizontal transverse arms 32 of each flat spring element 15 by means of two or more, preferably three brackets 33. The supporting springs 16 are of round steel or spring wire, and are by means of their U-shaped ends 34 connected to the cross-sectionally U-formed legs 13 of the spring box 5. Between the connecting area on the flat spring element 15 and the connecting areas on the legs 13 of the spring box 5, the supporting spring 6 extends at an incline toward the rear. The members 35 of supporting spring 16 which are located between the connecting areas are provided with resilient bends 36, 37. FIG. 2 shows two possibilities of bends in one figure. A high elasticity of the supporting spring 16 can be obtained by designing the bend as torsion spring wiring 36 which is bent out of the round wire of the supporting spring 16. However, it is also possible, solely or additionally to the torsion spring wirings 36 to provide simple bends, as for instance, the semicircular bends 27 which expediently are likewise located on both parts 35 of the supporting spring 16.

As shown in FIG. 2, each two adjacent flat spring elements 15 are connected to each other by a connecting bracket 38. The connecting bracket 38 is, in the particular embodiment shown, located in the central portion of the flat spring elements 15.

It is, of course, to be understood that the present invention is, by no means, limited to the particular embodiments shown in the drawings, but also comprises any modifications within the scope of the invention.

What I claim is:

1. A spring system for the upholstering of a motor vehicle seat having a back supporting portion, and a head supporting portion, which includes: first spring means arranged within said back supporting portion, second spring spring means arranged within said head supporting portion and connected to said first spring means so as to form a spring unit therewith, said second spring means including a first holding member arranged in the rear portion of said head supporting portion, and also including supporting spring means connected to said first holding member and extending downwardly therefrom while being provided with a plurality of curvatures, a second holding member arranged within said head supporting portion and having the lower part of said supporting spring means connected thereto, said first and second holding members being of substantially U-shape with the legs thereof extending downwardly and with the transverse arm thereof extending approximately horizontally, said supporting spring means being connected to the transverse arm of said first holding member and to the transverse arm of said second holding member, and means engaging the legs of said first and second holding members for holding the same in said head supporting portion.

2. A spring system according to claim 1, in which the means engaging the legs of said first and second holding members include guiding means for guiding said legs during an adjustment of said holding members as to height.

3. A spring system according to claim 1, in which said first holding member has its transverse arm located at a level higher than and in a plane behind the transverse arm of said second holding member.

4. A spring system according to claim 1, in which the leg portions of said first holding member which are adjacent to the transverse arm of said first holding member flare from the latter in downward direction.

5. A spring system according to claim 2, in which said back supporting portion comprises frame means, having the legs of said first holding member connected thereto, and in which the transverse arm of said second holding member comprises an offset portion extending in the direction toward said first holding member and having said supporting spring means connected thereto.

6. A spring system according to claim 5, in which said frame means is of U-shape, and which includes: a plurality of band spring elements respectively located between the legs of said U-shaped frame means, connecting spring means respectively connected to the ends of said band spring elements and connecting the latter to said frame means, said second holding member being mounted on at least one of said band spring elements.

7. A spring system according to claim 6, in which each of said connecting spring means has at least one resilient torsion spring loop between its connection with the respective band spring element and its connection with the respective frame means.

8. A spring system according to claim 6, in which each of said band spring elements when seen from the front has a longitudinally stretched rectangular shape with the end portions thereof extending forwardly at an acute angle with regard to the plane of the central portion thereof, and means connecting said central portion to said frame means.

9. A spring system according to claim 1, in which said supporting spring means comprises two horizontally spaced C-shaped supporting spring elements, the legs of each spring element extending in the direction toward the other spring element and being connected to the transverse arms of said first and second holding members, each arm between the legs of each C-shaped supporting spring element comprising a loop bulging in the direction toward the back of said head supporting portion.

10. A spring system according to claim 9, in which said loop has two pairs of hairpin-shaped loop sections forming an image to each other and arranged on opposite sides of a plane of symmetry therebetween, that portion of said loop which interconnects said two hairpin-shaped loop sections bulging in the direction toward the front of said head supporting section.

11. A spring system according to claim 9, in which each arm between the legs of each C-shaped supporting spring element comprises an upper and a lower forwardly curved portion while the central portion of each of said last mentioned arms is formed into said loop.

12. A spring system according to claim 9, in which said supporting spring means is of strip steel.

13. A spring system according to claim 1, in which said first and second holding members consist of flat steel, the major surface of said flat steel forming said second holding member being located approximately in a plane perpendicular to the direction of the main load acting thereupon.

14. A combination spring system for the upholstering of a motor vehicle seat having a back supporting portion, and a head supporting portion, which includes: first spring means arranged within said back supporting portion, and second spring means adjustably mounted on said first spring means for varying the height of said combination spring system and arranged within said head supporting portion and connected to said first spring means within said back supporting portion so as to form a spring unit therewith, said second spring means including a first holding member arranged in the rear portion of said head supporting portion, and also including supporting spring means connected to said first holding member and extending downwardly therefrom while being provided with a plurality of curvatures.

15. A spring system further in combination according to claim 14, which includes a second holding member arranged specifically within said head supporting portion and having the lower part of said supporting spring means connected to said second holding member.

References Cited

UNITED STATES PATENTS 2,292,597   8/1942   Bartlett et al. _____ 297—396
3,254,918   6/1966   Barker _____ 297—410

ARTHUR L. LA POINT, Primary Examiner

U.S. Cl. X.R.

297—410